Oct. 6, 1953  H. KUMMERMAN  2,654,488
HANDLING OF FREIGHT ABOARD SHIPS
Filed Nov. 1, 1949
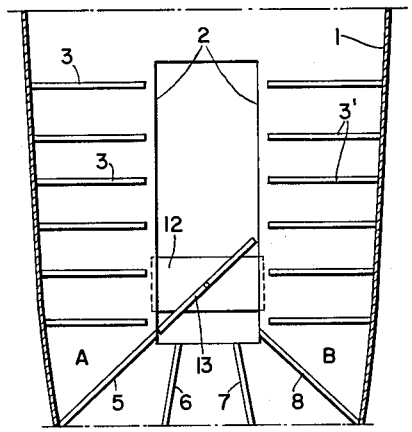
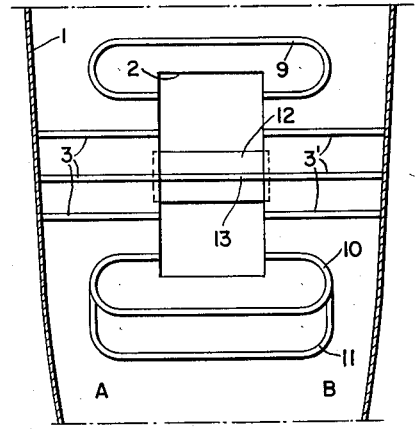
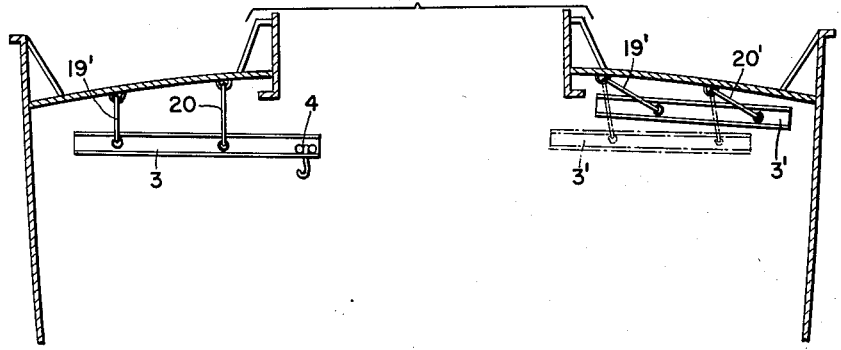
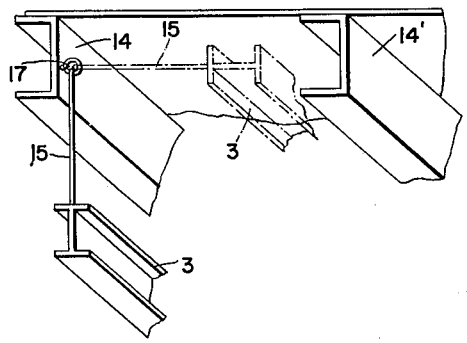
INVENTOR
HENRI KUMMERMAN
BY Mock + Blum
ATTORNEYS

Patented Oct. 6, 1953

2,654,488

UNITED STATES PATENT OFFICE 2,654,488

HANDLING OF FREIGHT ABOARD SHIPS

Henri Kummerman, Neuilly-sur-Seine, France

Application November 1, 1949, Serial No. 124,856
In France October 21, 1949

3 Claims. (Cl. 214—15)

In loading and unloading ships, the cargo is generally delivered into and removed from the hold and the between-decks of the ship with the help of cranes and/or derricks the hooks of which are moved vertically over and through the hatchways, or else by means of lateral doorways providing direct access into the hold or between-decks.

After the goods have been inserted into the between-decks, they have to travel from the point reached by the crane-hook (a point located within the hatchway clearing) or from the side doorways, as far as the location at which said goods are to be stowed in the between-decks. It is of major interest that such travel be reduced to as short a distance as possible and that this distance be covered as quickly and as conveniently as possible; this is desirable both in order to accelerate loading and unloading operations, and also so as not to have to clear the distance to be covered of any other freight which may be in place therein, or have to predetermine with accuracy the precise order in which the goods have to be stowed so that the articles stowed towards the end of the travel should not have to be unloaded first. It is not always possible in practice to predetermine such order in advance with any accuracy.

In another connection, it may be highly desirable to provide a method of handling freight by which goods may be directly and through an independent and continuous operation, be brought from the hold or between-decks of the ship to the wharf, and vice versa.

It is a chief object of this invention to provide a simple and practical solution to the above problems.

A general object of this invention is to greatly facilitate the loading and unloading of freight-carrying ships, both by saving time and labor in the loading and unloading operations, and by obviating the necessity for accurately predetermining the order in which the freight is to be stowed.

Another and related object of the invention is to enable an article of freight to be readily moved between a loading and unloading opening such as a hatchway and a remote location of the ship's freight-accommodating space such as a hold, at which location said article is to be, or was, stowed, even though the intervening space may already, or still, be partially obstructed with other articles of freight. This object of the invention is attained through the use of overhead suspended freight-handling means.

A further object is to facilitate shifting freight from one point to another of the ship's hold or between-decks, as from port to starboard and vice versa.

A further object is to provide freight-handling means affording the above advantages, which are rugged, simple and inexpensive to construct and operate, and which will not take up any valuable space in the ship's hold or between-decks nor interfere with the usual working conditions aboard the ship.

The above and further objects and advantages of the invention will appear from the ensuing more detailed description thereof.

Some practical embodiments of the invention will now be described by way of illustration and not of limitation, with reference to the accompanying diagrammatic drawings in which:

Fig. 1 is a horizontal view from beneath of an improved freight-handling installation according to my invention;

Fig. 2 is a similar showing of another embodiment;

Fig. 3 is a diagram illustrating the detail of one possible mounting of the monorails;

Fig. 4 shows a detail of a different embodiment for the mounting means for a monorail according to the invention.

As shown by way of example in Fig. 1, the hold or between-decks 1 of a ship comprising a hatchway 2 is provided with a system of overhead tracks, or monorails some of which (such as 3, 3') extend transversely with respect to the long axis of the ship, while others (such as 5, 6, 7 and 8) are substantially radial with respect to the hatchway.

Each monorail may comprise a freight-carrying car 4 (see Fig. 4) adapted to travel therealong. The radially-extending monorails 5, 6, 7, 8 enable the freight to reach the most distant corners of the hold from the hatchway opening. A hatch cover or panel 12 is adapted to travel over the hatchway coaming and carries a monorail section 13 the length of which is such that it might overbridge the hatchway opening and connect together two opposite but aligned sections 3—3'; when using radially extending sections 5, 6, 7, 8, etc. section 13 will obviously be pivotally mounted and will have a suitable length so as to be in a position to reach the different sections 3, 3', 5, 6, 7, 8, etc. The lengths of these latter sections will, of course, be also chosen in a suitable way. For instance, as shown in the drawing, sections 3, 3' end a little distance before the hatch, whereas sections 5, 6, 7, 8 extend a little farther.

Fig. 2 shows a different embodiment of the tracks or monorails, in which some of the monorails (such as 9, 10, 11) are curved. It will be understood that many different layouts could be provided for the tracks depending on the requirements in each specific instance, and that the monorail tracks may receive any suitable configuration.

It will also be understood that throughout the specification and claims, the term monorail is used in a broad sense to include any equivalent overhead transporting device.

According to a feature of the invention, in order to allow freight to be brought to a point vertically under the hatchway opening, and when necessary to be shifted as from the side A to the side B of the hold, and also to allow freight to be moved longitudinally of the ship's axis, one or more panels or thwart-carlings such as 12 are provided, travelling over the sides of the hatchway and provided at their undersurface with one or more cross-connecting track sections 13. The cross-connecting tracks 13 make it possible to connect the track sections on the side A with those on the side B of the hold. It will be understood that these cross-connecting track sections may if desired be provided associated with the conventional hatches closing the hatchway.

Fig. 3 illustrates one way of suspending the monorail tracks shown in Fig. 1, from the beam structure 14 of the ship's between-decks. In this embodiment, the monorail tracks 3 are suspended from the between-deck beams 14, 14' by means of pivotal suspension bars 15. The bars 15 may be swung about pivots 17 from the full line to the broken line position as indicated, so that the monorail will be moved correspondingly from its operative to its idle retracted position as shown.

In some cases, it may be desirable or essential that one end of the monorail 3, 3' extend as far as a point beneath the open hatchway area in order to allow freight to be loaded thereon with greater ease. At the same time however, it may be desirable not to allow the monorail to remain permanently in such position, in order to avoid the loss of valuable space. Accordingly, the monorail may as shown be suspended by means of an articulated suspension device 19, 20 which together with the monorail track 3, 3' constitutes parallel or quadrilateral linkage structure. In the right-hand diagram of Fig. 4 the monorail is shown in full lines in its retracted condition, and in broken-lines in its projected condition.

It may be understood that the above-described overhead track or monorail system according to the invention provides a very efficient and convenient means for handling ship-cargo, both in loading and unloading it into and from the ship, and when necessary in moving it about from one point to another within the hold, whereby considerable time may be saved.

The invention is not restricted to the specific details of structure described and illustrated, and modifications may be made therein within the scope of the ensuing claims.

What I claim is:
1. In combination with a ship having a hold provided with a hatch opening, a plurality of tracks mounted on the inner side of the ceiling of the hold for carrying cargo handling means throughout the hold, the tracks being interrupted by the hatch opening, a hatch cover section slidably disposed over the hatch opening, a track mounted on the underside of the hatch cover section to bridge the gap across the hatch opening between the tracks and means mounting said track for movement about a vertical axis.

2. In combination with a ship having a hold provided with a hatch opening, a plurality of tracks mounted on the inner side of the ceiling of the hold for carrying cargo handling means throughout the hold, the tracks being interrupted by the hatch opening, a hatch cover section slidably disposed over the hatch opening, a track mounted on the underside of the hatch cover section to bridge the gap across the hatch opening between the tracks and means mounting said track for movement about a vertical axis, said tracks mounted on the inner side of the ceiling of the hold extending transversely, radially and angularly of the hatch opening and said track on the hatch cover being movable about its vertical axis into selective alignment with said tracks.

3. In combination with a ship having a hold provided with a hatch opening, a plurality of tracks mounted on the inner side of the ceiling of the hold for carrying cargo handling means throughout the hold, the tracks being interrupted by the hatch opening, a hatch cover section slidably disposed over the hatch opening, a track mounted on the underside of the hatch cover section to bridge the gap across the hatch opening between the tracks and means mounting said track for movement about a vertical axis, said tracks being pivotally suspended from the inner side of the ceiling of the hold and being movable about horizontal axes relative to the ceiling.

HENRI KUMMERMAN.

References Cited in the file of this patent
UNITED STATES PATENTS

| Number | Name | Date |
| --- | --- | --- |
| 649,784 | Weeks | May 15, 1900 |
| 749,207 | Mackrow et al. | Jan. 12, 1904 |
| 1,071,549 | Coffin | Aug. 26, 1913 |
| 1,507,284 | Hensen | Sept. 2, 1924 |
| 1,939,037 | Bogert | Dec. 12, 1933 |
| 2,490,610 | Andersen | Dec. 6, 1949 |

FOREIGN PATENTS

| Number | Country | Date |
| --- | --- | --- |
| 290,234 | Germany | Feb. 14, 1916 |
| 177,591 | Great Britain | Mar. 24, 1922 |